United States Patent
Harada et al.

(10) Patent No.: US 12,261,290 B2
(45) Date of Patent: Mar. 25, 2025

(54) NONAQUEOUS ELECTROLYTE SECONDARY BATTERY, METHOD OF MANUFACTURING NONAQUEOUS ELECTROLYTE SECONDARY BATTERY, AND METHOD OF USING NONAQUEOUS ELECTROLYTE SECONDARY BATTERY

(71) Applicant: GS Yuasa International Ltd., Kyoto (JP)

(72) Inventors: Ryo Harada, Kyoto (JP); Akira Kishimoto, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 578 days.

(21) Appl. No.: 17/288,785

(22) PCT Filed: Oct. 25, 2019

(86) PCT No.: PCT/JP2019/042009
§ 371 (c)(1),
(2) Date: Apr. 26, 2021

(87) PCT Pub. No.: WO2020/090678
PCT Pub. Date: May 7, 2020

(65) Prior Publication Data
US 2022/0006080 A1 Jan. 6, 2022

(30) Foreign Application Priority Data
Oct. 31, 2018 (JP) .................. 2018-205574

(51) Int. Cl.
*H01M 4/02* (2006.01)
*H01M 4/505* (2010.01)
(Continued)

(52) U.S. Cl.
CPC ........... *H01M 4/505* (2013.01); *H01M 4/525* (2013.01); *H01M 10/052* (2013.01);
(Continued)

(58) Field of Classification Search
CPC .... H01M 4/505; H01M 4/525; H01M 10/052; H01M 10/0568; H01M 2004/021;
(Continued)

(56) References Cited

U.S. PATENT DOCUMENTS

2014/0004423 A1* 1/2014 Endo ...................... C01G 53/50
429/223
2014/0308584 A1* 10/2014 Endo ...................... H01M 4/505
429/223
(Continued)

FOREIGN PATENT DOCUMENTS

JP 2015-195195 A 11/2015
JP 2015-537352 A 12/2015
(Continued)

OTHER PUBLICATIONS

European Search Report (ESR) dated May 23, 2022 for European U.S. Appl. No. 19/880,886.
(Continued)

*Primary Examiner* — Christian Roldan
(74) *Attorney, Agent, or Firm* — RANKIN, HILL & CLARK LLP

(57) ABSTRACT

A nonaqueous electrolyte secondary battery including a positive electrode, a negative electrode, and a nonaqueous electrolyte, the positive electrode containing, as a positive active material, a lithium transition metal composite oxide having an $\alpha$-NaFeO$_2$ type crystal structure, a molar ratio of Li to Me, Li/Me of more than 1, Me representing transition metal elements including Ni and Mn or including Ni, Mn, and Co, and a molar ratio of Mn to Me, Mn/Me of 0.40 or
(Continued)

more and 0.65 or less, and the nonaqueous electrolyte containing, as an electrolyte salt, $LiPF_6$ and a lithium imide salt.

10 Claims, 2 Drawing Sheets

(51) Int. Cl.
  *H01M 4/525* (2010.01)
  *H01M 10/052* (2010.01)
  *H01M 10/0568* (2010.01)
(52) U.S. Cl.
  CPC .. *H01M 10/0568* (2013.01); *H01M 2004/021* (2013.01); *H01M 2004/028* (2013.01); *H01M 2300/0037* (2013.01)
(58) Field of Classification Search
  CPC ... H01M 2004/028; H01M 2300/0037; H01M 4/131; H01M 10/0525; H01M 10/446; Y02E 60/10
  USPC .......................................................... 429/199
  See application file for complete search history.

(56) References Cited

U.S. PATENT DOCUMENTS

| | | | |
|---|---|---|---|
| 2015/0008364 A1* | 1/2015 | Endo | H01M 4/502 429/223 |
| 2015/0056512 A1* | 2/2015 | Takeuchi | H01M 4/131 429/231.1 |
| 2015/0140443 A1 | 5/2015 | Takahashi et al. | |
| 2015/0303521 A1 | 10/2015 | Sasaki et al. | |
| 2016/0028110 A1 | 1/2016 | Yu et al. | |
| 2016/0190551 A1* | 6/2016 | Endo | H01M 4/364 252/182.1 |
| 2016/0301073 A1* | 10/2016 | Yoshikawa | C01G 53/006 |
| 2016/0329601 A1 | 11/2016 | Kim et al. | |
| 2017/0018808 A1* | 1/2017 | Takanashi | H01M 10/4235 |
| 2018/0006294 A1 | 1/2018 | Lee et al. | |
| 2019/0263675 A1 | 8/2019 | Yoshida et al. | |
| 2020/0028212 A1 | 1/2020 | Hirakawa et al. | |
| 2020/0058932 A1 | 2/2020 | Maeda | |
| 2020/0106134 A1 | 4/2020 | Hasegawa | |
| 2022/0089457 A1 | 3/2022 | Yoshida et al. | |

FOREIGN PATENT DOCUMENTS

| | | |
|---|---|---|
| JP | 2017-126542 A | 7/2017 |
| JP | 2017-532740 A | 11/2017 |
| JP | 2018-503962 A | 2/2018 |
| WO | 2014/080870 A1 | 5/2014 |
| WO | 2018/083937 A1 | 5/2018 |
| WO | 2018/212027 A1 | 11/2018 |

OTHER PUBLICATIONS

International Search Report (ISR) dated Jan. 28, 2020 filed in PCT/JP2019/042009.

* cited by examiner

NONAQUEOUS ELECTROLYTE SECONDARY BATTERY, METHOD OF MANUFACTURING NONAQUEOUS ELECTROLYTE SECONDARY BATTERY, AND METHOD OF USING NONAQUEOUS ELECTROLYTE SECONDARY BATTERY

TECHNICAL FIELD

The present invention relates to a nonaqueous electrolyte secondary battery, a method of manufacturing a nonaqueous electrolyte secondary battery, and a method of using a nonaqueous electrolyte secondary battery.

BACKGROUND ART

Nonaqueous electrolyte secondary batteries typified by lithium secondary batteries have been used as a power source for mobile devices such as laptop computers and mobile phones, and recently also as a power source for automobiles such as electric vehicles (EVs), hybrid electric vehicles (HEVs), and plug-in hybrid electric vehicles (PHEVs).

A nonaqueous electrolyte secondary battery generally includes a positive electrode containing a positive active material, a negative electrode containing a negative active material, a separator, and a nonaqueous electrolyte containing a nonaqueous solvent and an electrolyte salt.

One well-known example of the positive active material is a lithium transition metal composite oxide, one of the negative active material is a carbon material typified by graphite, and one of the nonaqueous electrolyte is an electrolyte produced by dissolving an electrolyte salt such as lithium hexafluorophosphate ($LiPF_6$) in a nonaqueous solvent containing, as main components, a cyclic carbonate such as ethylene carbonate and a chain carbonate such as diethyl carbonate.

As the positive active material, a lithium transition metal composite oxide having an $\alpha$-$NaFeO_2$ type crystal structure and described as $LiMeO_2$ (Me represents a transition metal such as Ni, Co, or Mn) (hereinafter, also referred to as "$LiMeO_2$ type active material") has been studied, and nonaqueous electrolyte secondary batteries in which $LiCoO_2$ is used have been widely put into practical use. However, the discharge capacity of $LiCoO_2$ is only about 120 to 180 mAh/g. In addition. Co is a rare resource and expensive.

Therefore, various $LiMeO_2$ type active materials containing further much Ni and Mn have been proposed as Me, and some of the active materials have been put into practical use. For example, $LiNi_{1/2}Mn_{1/2}O_2$ and $LiNi_{1/3}Co_{1/3}Mn_{1/3}O_2$ have a discharge capacity of 150 to 180 mAh/g.

In contrast with the $LiMeO_2$ type active material, active materials including a lithium transition metal composite oxide having an $\alpha$-$NaFeO_2$ type crystal structure and a molar ratio of lithium (Li) to the transition metal (Me), Li/Me, of more than 1 (hereinafter, also referred to as "lithium rich active material") are known. These active materials can be described as $Li_{1+\alpha}Me_{1-\alpha}O_2$ ($0<\alpha$). Here, the molar ratio of lithium (Li) to the transition metal (Me), Li/Me, is $(1+\alpha)/(1-\alpha)$. For example, when Li/Me is 1.5, $\alpha$ is 0.2.

Furthermore, inventions are also known in which a lithium imide salt is used, for various purposes, as an electrolyte salt dissolved in a nonaqueous solvent of a nonaqueous electrolyte.

Patent Document 1 describes "a lithium ion secondary battery comprising a positive electrode and a non-aqueous electrolyte, wherein the positive electrode includes a positive active material having an operating potential of 4.5 V or more with respect to a lithium metal, the non-aqueous electrolyte includes (a) an $N(SO_2F)_2$ anion (FSI anion); (b) a cyclic carbonate; (c) at least one selected from the group consisting of a fluorinated ether represented by the following formula (1), a fluorinated phosphate ester represented by the following formula (2), and a sulfone compound represented by the following formula (3) or the following formula (4); (Chem. 1) . . . " (claim 1).

Then, in paragraphs [0149] and [0150], Example 15 is described in which "$Li(Li_{0.15}Ni_{0.2}Mn_{0.65})O_2$" was used as the positive active material, a nonaqueous electrolyte solution was prepared by dissolving $LiPF_6$ as an electrolyte in a nonaqueous solvent at a concentration of 0.8 mol/L and dissolving LiFSI as an additive at a content of 1% by mass based on the total mass of the nonaqueous electrolyte solution (paragraph [0110]), and "a secondary battery was prepared and evaluated in the same manner as in Example 1 except that the upper limit voltage was 4.7 V, the lower limit voltage was 2.5 V and the number of cycles was 100 . . . this embodiment in which LiFSI was added was effective in improving cycle characteristics".

Patent Document 2 describes "an energy storage device comprising: an anode including a plurality of active material particles, each of the plurality of active material particles having a particle size of between about one micrometer and about fifty micrometers, wherein one or more of the plurality of active material particles are enclosed by and in contact with a membrane coating permeable to lithium ions; a cathode including a transition metal oxide material; and an electrolyte including a room temperature ionic liquid coupling the anode to the cathode" (claim 1), "the energy storage device of claim 1, wherein the transition metal oxide material has a formula (x) $Li_2MnO_2(1-x)LiR_1O_2$, wherein Mn is at least one of Mn, Ni, Co, and a cation or anion dopant, and x is greater than zero and less than one" (claim 6), and "the energy storage device of claim 1, wherein the electrolyte comprises at least one of a bisfluorosulfonylimide solvent anion and a lithium bisfluorosulfonylimide salt" (claim 9).

Regarding the energy storage device, it is described that "FIG. 18 shows full-cell data 1800 of a $Li_{1.35}Ni_{0.32}Mn_{0.68}O_2$ (85:7.5:7.5 et. %, OLO:PVDF:AB) cathode paired with a SiNW-cPAN anode and cycled in RTIL $PYR_{13}FSI$ (1.2 M LiFSI) and EC/DEC (1 M $LiPF_6$) electrolytes . . . SiNW/$PYR_{13}FSI$/OLO full cell demonstrates the possibility for a highly energy-dense lithium-ion battery" (paragraph [0056]).

"SiNW-cPAN" refers to an Si nanowire coated with a thin layer of cyclized polyacrylonitrile (paragraph [0055]), "RTIL" refers to a room temperature ionic liquid (paragraph [0025]), "$PYR_{13}$" refers to "Nmethyl-N-propyl pyrrolidinium", "FSI" refers to an "anionic bis(fluorosulfonyl) imide" (paragraph [0046]), and "OLO" refers to an overlithiated oxide (paragraph [0008]).

Patent Document 8 describes "a nonaqueous electrolyte secondary battery comprising a positive electrode containing a positive active material, a negative electrode, a resin microporous film disposed between the positive electrode and the negative electrode, and a nonaqueous electrolyte, wherein the nonaqueous electrolyte contains $LiPF_6$ and a lithium imide salt as an electrolyte salt, and a porous film containing heat-resistant fine particles and a binder resin is disposed between the positive electrode and the resin microporous film" (claim 1).

Table 2 describes Examples 6 to 10 of the nonaqueous electrolyte secondary battery in which the positive active material has a composition of "Li$_{1.15}$Ni$_{0.5}$Co$_{0.2}$Mn$_{0.3}$Zr$_{0.01}$O$_2$" (paragraph [0131]) or "Li$_{1.09}$Ni$_{0.5}$Co$_{0.2}$Mn$_{0.3}$Zr$_{0.005}$O$_2$" (paragraph [0133]), and the nonaqueous electrolyte solution contains 0.9 or 0.95 mol/L of LiPF$_6$ and 0.1 or 0.05 mol/L of lithium imide salt (LiFSI or LiTFSI) (paragraph [0155]). Regarding the batteries in Examples, it is described that "all of the discharge capacity retention ratio during the high temperature continuous charge test, the discharge capacity retention ratio during the high temperature storage test, and the discharge capacity retention ratio during the high temperature charge-discharge cycle test were high, and the high temperature durability was excellent . . . the safety was excellent because thermal runaway was well suppressed during the overcharge test. In particular, in the batteries of Examples 5 to 10 in which a positive active material was used that includes a Zr oxide present on the surface or grain boundary of the lithium-containing composite oxide particles, the increase in the strength of the positive active material particles was observed, and correspondingly, the high-temperature charge-discharge cycle characteristics were further improved" (paragraph [0158]).

Patent Document 4 describes "a lithium secondary battery comprising a nonaqueous electrolyte solution containing lithium bis(fluorosulfonyl)imide (LiFSI) and a fluorinated ether-based compound additive; a positive electrode containing a lithium-nickel-manganese-cobalt-based oxide as a positive active material; a negative electrode; and a separation membrane" (claim 1) and "the lithium secondary battery according to claim 1, wherein the lithium-nickel-manganese-cobalt-based oxide includes an oxide represented by the chemical formula (1):

Li$_{1+x}$(Ni$_a$Co$_b$Mn$_c$)O$_2$ [Chem. (1)]

wherein 0.55≤a≤0.65, 0.18≤b≤0.22, 0.18≤c≤0.22, −0.2≤x≤0.2, and x+a+b+c=1" (claim 2).

It is described that the lithium secondary batteries of Examples 1 to 6 were manufactured using "Li(Ni$_{0.6}$Co$_{0.2}$Mn$_{0.2}$)O$_2$" as the positive active material (paragraphs [0038] to [0045]), and that "in the characteristics after storage at high temperature (capacity and power characteristics), it was confirmed that when combined with LiFSI, which is a lithium salt, the lithium secondary batteries of Examples 1 to 5 had effects superior to those of the secondary batteries of Comparative Examples 1 to 3" (paragraph [0053]).

PRIOR ART DOCUMENTS

Patent Documents

Patent Document 1: WO 2014/080870
Patent Document 2: JP-T-2018-503962
Patent Document 8: JP-A-2016-196195
Patent Document 4: JP-T-2017-582740

SUMMARY OF THE INVENTION

Problems to be Solved by the Invention

A nonaqueous electrolyte secondary battery in which a "lithium rich active material" is used as a positive active material and LiPF$_6$ is used as an electrolyte salt has a problem of high initial AC resistance.

Patent Documents 1 to 4 describe a nonaqueous electrolyte secondary battery in which the electrolyte salt of the nonaqueous electrolyte contains a lithium imide salt. Each of the nonaqueous electrolyte secondary batteries is excellent in cycle performance, energy density, high temperature charge-discharge cycle characteristics, and characteristics (capacity and power characteristics) after high temperature storage. Patent Documents 1 to 3 also describe a battery in which a "lithium rich active material" is used in a positive electrode, but do not focus on the initial AC resistance, and do not describe reduction in the initial AC resistance.

An object of the present invention is to provide a nonaqueous electrolyte secondary battery having a reduced initial AC resistance.

Means for Solving the Problems

One aspect of the present invention is a nonaqueous electrolyte secondary battery including a positive electrode, a negative electrode, and a nonaqueous electrolyte, the positive electrode containing, as a positive active material, a lithium transition metal composite oxide having an α-NaFeO$_2$ type crystal structure, a molar ratio of Li to Me, Li/Me of more than 1, Me representing transition metal elements including Ni and Mn or including Ni, Mn, and Co, and a molar ratio of Mn to Me, Mn/Me of 0.40 or more and 0.65 or less, and the nonaqueous electrolyte containing, as an electrolyte salt, LiPF$_6$ and a lithium imide salt.

Another aspect of the present invention is a method of manufacturing the nonaqueous electrolyte secondary battery, the method including setting a maximum potential of the positive electrode in an initial charge-discharge process to less than 4.5 V (vs. Li/Li$^+$).

Another aspect of the present invention is a method of using the nonaqueous electrolyte secondary battery, the method including setting a maximum potential of the positive electrode during charge to less than 4.5 V (vs. Li/Li$^+$).

Advantages of the Invention

With the above-described battery or method, it is possible to provide a nonaqueous electrolyte secondary battery in which a "lithium rich active material" is used as a positive active material and the initial AC resistance is reduced.

BRIEF DESCRIPTION OF THE DRAWINGS

FIG. 8 is a graph illustrating a "region where the potential change is relatively flat with respect to the amount of charge" in a nonaqueous electrolyte secondary battery.

MODE FOR CARRYING OUT THE INVENTION

Figure 1:
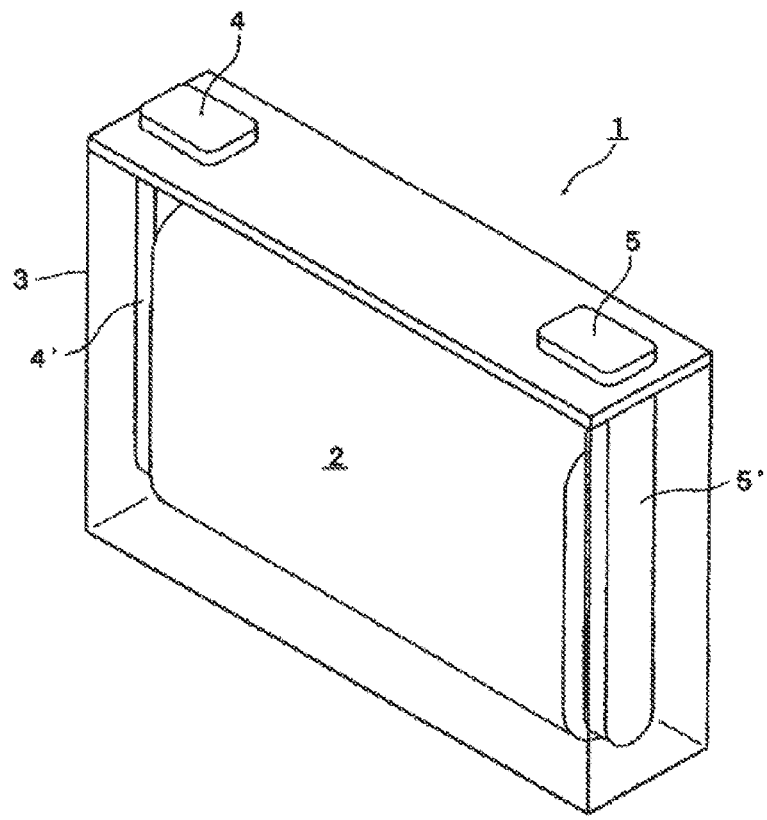
FIG. 1 is an external perspective view showing one embodiment of a nonaqueous electrolyte secondary battery.

The configuration and effects of the present invention will be described together with technical ideas. However, the mechanism is partially based on estimation, and the correctness of the estimation does not limit the present invention. The present invention can be practiced in various other forms without departing from its main features. Therefore, the embodiments and Examples described below are merely examples in all respects, and should not be limitedly interpreted. Furthermore, all modifications and changes belonging to the equivalent scope of the claims are within the scope of the present invention.

A nonaqueous electrolyte secondary battery according to one embodiment of the present invention is a nonaqueous electrolyte secondary battery including a positive electrode, a negative electrode, and a nonaqueous electrolyte, the positive electrode containing, as a positive active material, a lithium transition metal composite oxide having an α-NaFeO$_2$ type crystal structure, a molar ratio of Li to Me, Li/Me of more than 1, Me representing transition metal elements including Ni and Mn or including Ni, Mn, and Co, and a molar ratio of Mn to Me, Mn/Me of 0.40 or more and 0.65 or less, and the nonaqueous electrolyte containing, as an electrolyte salt, LiPF$_6$ and a lithium imide salt.

According to this embodiment, it is possible to provide a battery having a reduced initial AC resistance.

Here, the lithium transition metal composite oxide may have a molar ratio of Li to Me, Li/Me of 1.15 or more and 1.30 or less. If the lithium transition metal composite oxide has such a molar ratio, it is possible to provide a battery having a reduced initial AC resistance and a high capacity.

The lithium imide salt contained, as an electrolyte salt, in the nonaqueous electrolyte may be LiN(FSO$_2$)$_2$.

A method of manufacturing of a nonaqueous electrolyte secondary battery, according to another embodiment of the invention in the present application, is a method of manufacturing the above-described nonaqueous electrolyte secondary battery, the method including setting a maximum potential of the positive electrode in an initial charge-discharge process to less than 4.5 V (vs. Li/Li$^+$).

According to this embodiment, it is possible to manufacture a battery having a reduced initial AC resistance.

Hereinafter, one embodiment and another embodiment of the present invention (hereinafter collectively referred to as "the present embodiment") will be described in detail.

<Lithium Transition Metal Composite Oxide>

The lithium transition metal composite oxide contained in the positive active material of the positive electrode included in the nonaqueous electrolyte secondary battery according to the present embodiment is represented by the general formula Li$_{1+\alpha}$Me$_{1-\alpha}$O$_2$ (0<α, Me represents transition metal elements including Ni and Mn or including Ni, Mn, and Co). That is, the lithium transition metal composite oxide is a "lithium rich active material" having a molar ratio of Li to Me, Li/Me, of more than 1.

Li/Me is preferably 1.15 or more, more preferably 1.2 or more, and still more preferably more than 1.2 in order to achieve high capacity and low resistance. From the viewpoint of reducing the initial AC resistance, Li/Me is preferably 1.45 or less, and more preferably 1.8 or less.

The molar ratio of Mn to Me of the lithium transition metal composite oxide according to the present embodiment, Mn/Me, is 0.40 or more, and more preferably 0.46 or more from the viewpoint of stabilizing the layered structure. From the viewpoint of reducing the initial AC resistance, Mn/Me is 0.66 or less, and more preferably 0.60 or less.

The molar ratio of Ni to the transition metal elements Me, Ni/Me, is preferably 0.2 or more in order to improve the charge-discharge cycle performance of the nonaqueous electrolyte secondary battery. Ni/Me is preferably 0.5 or less, and more preferably 0.4 or less.

The molar ratio of Co to the transition metal elements Me, Co/Me, is preferably 0.0 or more, and more preferably 0.15 or more in order to enhance the conductivity of the active material particle. However, in order to reduce the material cost, Co/Me is preferably 0.4 or less, more preferably 0.8 or less, and may be 0.0.

It is not excluded that the lithium transition metal composite oxide according to the present embodiment contains small amounts of other metals, for example, alkali metals such as Na and K, alkaline earth metals such as Mg and Ca, and transition metals typified by 3d transition metals such as Fe as long as an effect of the present invention is not impaired.

The lithium transition metal composite oxide according to the present embodiment has an α-NaFeO$_2$ type crystal structure. The lithium transition metal composite oxide after synthesis (before charge-discharge) has a superlattice peak (peak observed in the case of a Li[Li$_{1/3}$Mn$_{2/3}$]O$_2$ type monoclinic crystal) observed in the range of 2θ=20 to 22° in the X-ray diffraction diagram obtained using a CuKα ray, and belongs to the space group P3$_1$12. The superlattice peak (hereinafter, referred to as "diffraction peak in the range of 20 to 22°") does not disappear even when charge-discharge is performed in the potential region where the positive electrode potential is less than 4.5 V (vs. Li/Li$^+$). However, when charge is performed until the potential reaches 4.5 V (vs. Li/Li$^+$) or more to charge the symmetry of the crystal owing to the extraction of Li in the crystal, the diffraction peak in the range of 20 to 22° disappears, so that the lithium transition metal composite oxide belongs to the space group R3-m. The diffraction peak in the range of 20 to 22° does not reappear after once it disappeared regardless of the subsequent charge-discharge process.

Here, P3$_1$12 is a crystal structure model in which the atom positions in 3a, 3b, and 6c sites in R3-m are subdivided. The P3$_1$12 model is employed in the case that the atomic position in R3-m is orderly. The term "R3-m" is originally written by adding a bar "-" on "3" of "R3m".

<X-Ray Diffraction Measurement>

In the present specification, the X-ray diffraction is measured under the following conditions. The radiation source is CuKα, the acceleration voltage is 30 kV, and the acceleration current is 15 mA. The sampling width is 0.01 deg, the scan speed is 1.0 deg/min, the divergence slit width is 0.625 deg, the light receiving slit is open, and the scattering slit width is 8.0 mm.

<Method of Confirming Diffraction Peak>

The phrase "a diffraction peak is observed in the range of 20 to 22° in the X-ray diffraction diagram obtained using a CuKα ray" refers to a condition that the ratio of the difference between the maximum intensity and the minimum intensity in the range of the diffraction angle of 20 to 22° ($I_{21}$) to the difference between the maximum intensity and the minimum intensity in the range of the diffraction angle of 17 to 19° ($I_{18}$), that is, the value of "$I_{21}/I_{18}$" is in the range of 0.001 to 0.1.

As the sample to be used for the X-ray diffraction measurement, the positive active material powder before preparation of an electrode (powder before charge-discharge) is used as it is. In the case that a sample is taken from the positive electrode taken out by disassembling the nonaqueous electrolyte secondary battery (hereinafter, also referred to as "battery"), the battery is discharged at a constant current of 0.1 C before the disassembly until the battery voltage reaches the lower limit of the specified voltage. The constant current (0.1 C) is 1/10 of the current value at which constant current energization for 1 hour supplies the battery with the same amount of the electricity as the nominal capacity of the battery. The battery is disassembled, the positive electrode is taken out, a battery having a metallic lithium electrode as a counter electrode is assembled, and the battery is discharged at a constant current of 10 mA per 1 g of the positive composite until the potential of the positive electrode reaches 2.0 V (vs. Li/Li$^+$) for adjustment to a completely discharged state. The battery is re-disassembled, and the positive electrode is taken out. The positive electrode taken out is washed with dimethyl carbonate to thoroughly remove the adhering nonaqueous electrolyte, dried at room temperature for 24 hours, and then the positive composite on the current collector is taken out. The positive composite taken out is lightly crushed with an agate mortar, placed in a sample holder for X-ray diffraction measurement, and measured.

The operations from the disassembly to the re-disassembly of the battery, and the washing and the drying of the positive electrode are performed in an argon atmosphere with a dew point of −60° C. or less.

In the nonaqueous electrolyte secondary battery according to the present embodiment, the maximum potential of the positive electrode in the initial charge-discharge process is preferably less than 4.5 V (vs. Li/Li$^+$), and the positive active material of such a nonaqueous electrolyte secondary battery has a diffraction peak observed in the range of 20 to 22° in the X-ray diffraction diagram obtained by X-ray diffraction using a CuKα ray.

In the nonaqueous electrolyte secondary battery containing the positive active material having high Li/Me, the effect of reducing the initial AC resistance can be further increased.

<Method of Manufacturing Precursor of Lithium Transition Metal Composite Oxide>

Next, a method of manufacturing a precursor of the lithium transition metal composite oxide used for manufacturing the positive active material of the nonaqueous electrolyte secondary battery according to the present embodiment will be described.

The lithium transition metal composite oxide according to the present embodiment can be obtained basically by preparing a raw material containing the metal elements (Li, Ni, Co, Mn) included in the positive active material in accordance with the composition of the desired positive active material (oxide) and firing the material.

As a method of preparing a lithium transition metal composite oxide having a desired composition, a so-called "solid phase method" and a "coprecipitation method" are known. In the "solid phase method", compounds each including Li, Ni, Co, or Mn are mixed and fired. In the "coprecipitation method", a coprecipitation precursor in which Ni, Co, and Mn are present in one particle is prepared in advance, a Li salt is mixed to the coprecipitation precursor, and the mixture is fired. In the synthesis process by the "solid phase method", it is difficult to obtain a sample in which each element is uniformly distributed in one particle because Mn is particularly less likely to be uniform in a solid solution of Ni and Co. Although many documents describe an attempt to form a solid solution of Ni and Co partially including Mn (such as LiNi$_{1-x}$Mn$_x$O$_2$) by the "solid phase method", a uniform phase at the atomic level is obtained more easily by selecting the "coprecipitation method". Therefore, in Examples described below, the "coprecipitation method" was employed.

In the method of manufacturing a precursor of the lithium transition metal composite oxide according to the present embodiment, it is preferable to add dropwise a raw material aqueous solution containing Ni and Mn or containing Ni, Mn, and Co to prepare a precursor by coprecipitation of a compound containing Ni and Mn or containing Ni, Mn, and Co.

Among Ni, Co, and Mn, Mn is easily oxidized in preparation of a coprecipitation precursor, therefore, it is not easy to prepare a coprecipitation precursor in which Ni and Mn, or Ni, Mn, and Co are uniformly distributed in a divalent state, so that mixing of Ni, Co, and Mn at the atomic level tends to be insufficiently uniform. Therefore, in the present invention, it is preferable to remove dissolved oxygen in order to suppress the oxidation of Mn distributed in the coprecipitation precursor. Examples of the method of removing dissolved oxygen include a bubbling method in which a gas containing no oxygen is used. The gas containing no oxygen (O$_2$) is not limited, and a gas such as a nitrogen gas, an argon gas, or carbon dioxide (CO$_2$) can be used.

The pH is not limited in the process of manufacturing a precursor by coprecipitation of a compound containing Ni and Mn or containing Ni, Mn, and Co in a solution. In the case of preparing the coprecipitation precursor as a coprecipitation hydroxide precursor, the pH can be set to 10.5 to 14.0. In order to increase the tap density of the precursor and the composite oxide, it is preferable to control the pH. By setting the pH to 11.5 or less, the tap density of the composite oxide can be 1.00 g/cm$^3$ or more, and the high rate discharge performance can be improved. By setting the pH to 11.0 or less, the particle growth can be promoted, and therefore, it is possible to shorten the stirring duration after completion of the dripping of the raw material aqueous solution.

In the case of preparing the coprecipitation precursor as a coprecipitation carbonate precursor, the pH can be set to 7.5 to 11.0. By setting the pH to 9.4 or less, the tap density of the composite oxide can be 1.26 g/cm$^3$ or more, and the high rate discharge performance can be improved. By setting the pH to 8.0 or less, the particle growth can be promoted, and therefore, it is possible to shorten the stirring duration after completion of the dripping of the raw material aqueous solution.

Examples of the raw material of the coprecipitation precursor include nickel hydroxide, nickel carbonate, nickel sulfate, nickel nitrate, and nickel acetate as an Ni source, cobalt sulfate, cobalt nitrate, and cobalt acetate as a Co source, and manganese oxide, manganese carbonate, manganese sulfate, manganese nitrate, and manganese acetate as an Mn source.

The rate of adding dropwise the raw material aqueous solution has a great influence on the uniformity of the element distribution in one particle of the coprecipitation precursor to be formed. Although the preferable rate is affected by conditions such as the size of a reaction vessel, stirring conditions, the pH, and the reaction temperature, the rate is preferably 30 mL/min or less. In order to improve the discharge capacity, the rate is more preferably 10 mL/min or less, and most preferably 5 mL/min or less.

In the case that a complexing agent such as NH$_3$ is present in a reaction vessel and a certain convection condition is applied, the rotation and the revolution of the particles are promoted in the stirring vessel by continuing stirring after completion of the dripping of the raw material aqueous solution, and in this process, the particles gradually grow into a concentric spherical shape while colliding with each other. That is, the coprecipitation precursor is formed through a two-step reaction including a metal complex formation reaction that occurs when the raw material aqueous solution is added dropwise in the reaction vessel, and a precipitation formation reaction that occurs during the retention of the metal complex in the reaction vessel. Therefore, a coprecipitation precursor having a desired particle size can be obtained by appropriately selecting the time for continuing stirring after completion of the dripping of the raw material aqueous solution.

Although the preferable stirring duration after completion of the dripping of the raw material aqueous solution is affected by conditions such as the size of a reaction vessel, stirring conditions, the pH, and the reaction temperature, the stirring duration is preferably 0.6 hours or more, and more preferably 1 hour or more in order to grow the particles as uniform spherical particles. Furthermore, the stirring duration is preferably 30 hours or less, more preferably 25 hours or less, and most preferably 20 hours or less in order to reduce the possibility that the particle size is too large to obtain sufficient power performance in the low SOC region of the battery.

<Method of Manufacturing Lithium Transition Metal Composite Oxide>

The method of manufacturing the lithium transition metal composite oxide contained in the positive active material of the nonaqueous electrolyte secondary battery according to the present embodiment is preferably a method in which the coprecipitation precursor and a lithium compound are mixed and fired.

As the lithium compound, commonly used lithium compounds such as lithium hydroxide, lithium carbonate, lithium nitrate, and lithium acetate can be used. Along with the above-described lithium compound, lithium fluoride, lithium sulfate, or lithium phosphate may be used as a sintering aid. The addition ratio of the sintering aid is preferably 1 to 10 mol % based on the total molar amount of the lithium compound. The lithium compound is preferably charged in an amount excessive by about 1 to 5% based on the total amount of the lithium compound in anticipation that a part of the lithium compound will disappear during firing.

The firing temperature affects the reversible capacity of the positive active material.

If the firing temperature is too low, crystallization does not proceed sufficiently and the electrode characteristics tend to be deteriorated. In one aspect of the present invention, the firing temperature is preferably 800° C. or more. By setting the firing temperature to 800° C. or more, positive active material particles having a high sintering degree can be obtained, and charge-discharge cycle performance can be improved.

If the firing temperature is too high, the layered α-NaFeO$_2$ structure changes to a rock salt type cubic structure. The structural change causes a disadvantageous state for the movement of the lithium ions in the positive active material during charge-discharge reaction, and the state leads to deterioration in the discharge performance. In the present invention, the firing temperature is preferably 1,000° C. or less. By setting the firing temperature to 1,000° C. or less, the charge-discharge cycle performance can be improved.

Therefore, in preparing the positive active material containing the lithium transition metal composite oxide according to one aspect of the present invention, the firing temperature is preferably 800 to 1,000° C. in order to improve the charge-discharge cycle performance.

<Nonaqueous Electrolyte>

The nonaqueous electrolyte according to the present embodiment contains, as an electrolyte salt dissolved in a nonaqueous solvent, LiPF$_6$ and a lithium imide salt.

With the electrolyte salt containing a lithium imide salt, it is possible to reduce the initial AC resistance of a nonaqueous electrolyte secondary battery in which a "lithium rich active material" is used as a positive active material.

Although the action of the lithium imide salt contained in the electrolyte salt is not clear, it is presumed that the charge transfer resistance of the positive active material is reduced because the presence of the lithium imide salt causes formation of a film on the positive electrode mainly in the initial charge-discharge process, and that the initial AC resistance is reduced because the film suppresses the elution of Mn from the positive active material into the nonaqueous electrolyte. However, in the case that the positive active material contains Mn in the range where Mn/Me is more than 0.65, it is presumed that the elution of Mn from the positive active material into the nonaqueous electrolyte cannot be sufficiently suppressed because the diffusion resistance of the positive active material is dominant even if a film is formed on the positive electrode, and because the amount of Mn eluted is large. In particular in the case that the initial charge-discharge process is performed with the positive active material containing Mn in the range where Mn/Me is more than 0.65 under the condition that the maximum potential of the positive electrode is 4.5 V (vs. Li/Li$^+$) or more, it is presumed that the above-described effect cannot be obtained because the decomposition product of the lithium imide salt itself acts toward promoting the elution of Mn from the positive active material into the nonaqueous electrolyte.

Examples of the lithium imide salt include LiN(FSO$_2$)$_2$, LiN(CF$_3$SO$_2$)$_2$, and LiN(C$_2$F$_5$SO$_2$)$_2$, and LiN(FSO$_2$)$_2$ is preferable from the viewpoint of ionic conductivity.

The concentration of the electrolyte salt in the nonaqueous electrolyte is preferably 0.1 mol/L to 5 mol/L, and more preferably 0.5 mol/L to 2.5 mol/L in order to obtain a nonaqueous electrolyte secondary battery having high battery characteristics.

The molar ratio of the lithium imide salt in the electrolyte salt is preferably 8% or more, more preferably 33% or more, and still more preferably 50% or more. Furthermore, the molar ratio is preferably 83% or less.

The electrolyte salt contained together with the lithium imide salt contains LiPF$_6$ from the viewpoints of stability and cost. The electrolyte salt may be a mixture of known lithium salts such as LiBF$_4$, LiSbF$_6$, and LiAsF$_6$.

Examples of the nonaqueous solvent used in the nonaqueous electrolyte include cyclic carbonates such as propylene carbonate, ethylene carbonate, butylene carbonate, and chloroethylene carbonate and fluorides thereof; cyclic esters such as γ-butyrolactone and γ-valerolactone; chain carbonates such as dimethyl carbonate, diethyl carbonate, and ethyl methyl carbonate; chain esters such as methyl formate, methyl acetate, and methyl butyrate; tetrahydrofuran and its derivatives; ethers such as 1,3-dioxane, 1,4-dioxane, 1,2-dimethoxyethane, 1,4-dibutoxyethane, and methyldiglyme; nitriles such as acetonitrile and bensonitrile; dioxolane and its derivatives; ethylene sulfide and its derivatives, and mixtures of two or more kinds of the above-described nonaqueous solvents.

Among these nonaqueous solvents, the fluorinated cyclic carbonates are particularly preferably contained. Examples of the fluorinated cyclic carbonate include 4-fluoroethylene carbonate, 4,4-difluoroethylene carbonate, 4,5-difluoroethylene carbonate, 4,4,6-trifluoroethylene carbonate, and 4,4,5,5-tetrafluoroethylene carbonate. Among the fluorinated cyclic carbonates, 4-fluoroethylene carbonate (FEC) is preferably used from the viewpoint of suppressing battery swelling caused by generation of a gas in the battery.

The content of the fluorinated cyclic carbonate is preferably 8 to 80% by volume, and more preferably 5 to 25% by volume in the nonaqueous solvent.

The nonaqueous electrolyte according to the present embodiment may contain an additive generally used in nonaqueous electrolytes as long as an effect of the present invention is not impaired. Examples of the additive include aromatic compounds such as biphenyl, alkylbiphenyl, terphenyl, partially hydrogenated terphenyl, cyclohexylbenzene, t-butylbenzene, t-amylbenzene, diphenyl ether, and dibenzofuran; compounds of the above-described aromatic compounds partially fluorinated, such as 2-fluorobiphenyl, o-cyclohexylfluorobenzene, and p-cyclohexylfluorobenzene; overcharge inhibitors such as fluorine-containing anisole compounds such as 2,4-difluoroanisole, 2,5-difluoroanisole, 2,6-difluoroanisole, and 8,5-difluoroanisole; negative electrode film forming agents such as vinylene carbonate, methyl vinylene carbonate, ethyl vinylene carbonate, succinic anhydride, glutaric anhydride, maleic anhydride, citraconic anhydride, glutaconic anhydride, itaconic anhydride, and cyclohexanedicarboxylic anhydride; ethylene sulfite, propylene sulfite, dimethyl sulfite, propane sultone, propene sultone, butane sultone, methyl methanesulfonate, busulfan, methyl toluenesulfonate, dimethyl sulfate, ethylene sulfate, sulfolane, dimethyl sulfone, diethyl sulfone, dimethylsulfoxide, diethylsulfozide, tetramethylene sulfoxide, diphenyl sulfide, 4,4'-bis(2,2-dioxo-1,3,2-dioxathiolane), 4-methylsulfonyloxymethyl-2,2-dioxo-1,3,2-dioxathiolane, thioanisole, diphenyl disulfide, dipyridinium disulfide, perfluorooctane, tristrimethylsilyl borate, tristrimethylsilyl phosphate, tetrakistrimethylsilyl titanate, lithium monofluorophosphate, and lithium difluorophosphate. The above-described additives can be added to the nonaqueous electrolyte singly, or in combination of two or more kinds thereof.

The content rate of each of these compounds in the nonaqueous electrolyte is not particularly limited, and is preferably 0.01% by mass or more, more preferably 0.1% by mass or more, and still more preferably 0.2% by mass or more, and the upper limit is preferably 5% by mass or less, more preferably 3% by mass or less, and still more preferably 2% by mass or less based on all the components other than the electrolyte salt included in the nonaqueous electrolyte. The purpose of adding these compounds is, for example, to improve charge-discharge efficiency, suppress increase in internal resistance, suppress battery swelling, and improve charge-discharge cycle performance.

<Negative Electrode Material>

The negative electrode material of the battery according to the present embodiment is not limited, and any material may be selected as long as it is capable of releasing or storing lithium ions. Examples of the negative electrode material include lithium composite oxides such as lithium titanate having a spinel type crystal structure typified by $Li[Li_{1/3}Ti_{5/3}]O_4$, metallic lithium, lithium alloys (metallic lithium-containing alloys such as lithium-silicon, lithium-aluminum, lithium-lead, lithium-tin, lithium-aluminum-tin, lithium-gallium, and Wood's alloys), metals capable of storing and releasing lithium, such as silicon, antimony, and tin, alloys of these metals, metal oxides such as silicon oxide and tin oxide, and carbon materials (such as graphite, non-graphite carbon, low temperature fired carbon, and amorphous carbon).

<Positive/Negative Electrode>

The positive active material and the negative electrode material are preferably powders having an average particle size of 100 μm or less. In particular, the powder of the positive active material preferably has an average particle size of 16 μm or less in order to improve the high power characteristics of the nonaqueous electrolyte secondary battery, and preferably 10 μm or more in order to maintain the charge-discharge cycle performance. The powder having a predetermined shape is obtained using a pulverizer or a classifier. The pulverization is performed using, for example, a mortar, a ball mill, a sand mill, a vibrating ball mill, a planetary ball mill, a jet mill, a counter jet mill, a swirling airflow jet mill, or a sieve. The pulverization can be performed by wet pulverization in which water or an organic solvent such as hexane is allowed to coexist. The classification method is not particularly limited, and the classification is performed using a sieve, an air classifier, or the like by dry or wet classification as needed.

The positive electrode and the negative electrode contain the positive active material and the negative electrode material as a main component respectively, and may contain other components such as a conductive agent, a binder, a thickener, and a filler in addition to the main component.

The conductive agent is not limited as long as it is an electron conductive material that does not adversely affect the battery performance. Usually, one conductive material or a mixture of conductive materials can be contained, and examples of the conductive material include natural graphite (such as scaly graphite, scale-like graphite, and earthy graphite), artificial graphite, carbon black, acetylene black, ketjen black, carbon whiskers, carbon fibers, metal (copper, nickel, aluminum, silver, gold, and the like) powders, metal fibers, and conductive ceramic materials.

Among these conductive agents, acetylene black is preferable from the viewpoint of electron conductivity and coatability. The addition amount of the conductive agent is preferably 0.1% by mass to 50% by mass, and particularly preferably 0.5% by mass to 30% by mass based on the total mass of the positive or negative electrode. It is particularly preferable to use acetylene black pulverized into ultrafine particles having a size of 0.1 to 0.5 μm because the required carbon amount can be reduced. The method of mixing the components is a physical mixing method in which, ideally, homogeneous mixing is performed. Therefore, the mixing can be performed using a powder mixer such as a V-shaped mixer, an S-shaped mixer, a mortar, a ball mill, or a planetary ball mill by dry or wet mixing.

As the binder, one polymer or a mixture of two or more polymers can be usually used, and examples of the polymer include thermoplastic resins such as polytetrafluoroethylene (PTFE), polyvinylidene fluoride (PVDF), polyethylene, and polypropylene, and polymers having rubber elasticity, such as ethylene-propylene-diene terpolymer (EPDM), sulfonated EPDM, styrene butadiene rubber (SBR), and fluororubber. The addition amount of the binder is preferably 1 to 50% by mass, and particularly preferably 2 to 30% by mass based on the total mass of the positive or negative electrode.

The filler is not limited as long as it is a material that does not adversely affect the battery performance. The materials usually used are, for example, olefin-based polymers such as polypropylene and polyethylene, amorphous silica, alumina, zeolite, glass, and carbon. The addition amount of the filler is preferably 30% by mass or less based on the total mass of the positive or negative electrode.

The positive electrode and the negative electrode are each suitably prepared by forming a mixture layer. The mixture layer is formed by mixing the main component (the positive active material in the positive electrode or the negative electrode material in the negative electrode), other materials, and an organic solvent such as N-methylpyrrolidone or toluene or water as a dispersion medium to obtain a coating paste, applying or pressure-bonding the obtained coating paste to the current collector described in detail below, and heat-treating the resulting product at a temperature of about 50° C. to 250° C. for about 2 hours to remove the dispersion medium. In the method of applying the coating paste, it is preferable to apply the coating paste into any thickness and any shape by a means such as roller coating in which an applicator roll or the like is used, screen coating, doctor blade method, spin coating, or bar coater, but the means is not limited to the above-described means.

As the current collector, current collecting foil such as Al foil or Cu foil can be used. Al foil is preferable as the current collector of the positive electrode, and Cu foil is preferable as the current collector of the negative electrode. The current collector preferably has a thickness of 10 to 30 μm. The mixture layer preferably has a thickness of 40 to 150 μm (excluding the thickness of the current collector).

<Separator>

As the separator used in the nonaqueous electrolyte secondary battery according to the present embodiment, a porous membrane, a nonwoven fabric, and the like that exhibit excellent high rate discharge performance are preferably used singly or in combination. Examples of the material included in the separator for the nonaqueous electrolyte secondary battery include polyolefin-based resins typified by polyethylene, polypropylene, and the like, polyester-based resins typified by polyethylene terephthalate, polybutylene terephthalate, and the like, polyvinylidene fluoride, vinylidene fluoride-hexafluoropropylene copolymers, vinylidene fluoride-perfluorovinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers, and vinylidene fluoride-ethylene-tetrafluoroethylene copolymers.

The separator preferably has a porosity of 98% by volume or less from the viewpoint of strength. From the viewpoint of charge-discharge characteristics, the porosity is preferably 20% by volume or more.

As the separator, a polymer gel may be used that includes a polymer such as acrylonitrile, ethylene oxide, propylene oxide, methyl methacrylate, vinyl acetate, vinylpyrrolidone, or polyvinylidene fluoride and a nonaqueous electrolyte. It is preferable to use the nonaqueous electrolyte in a gel state as described above from the viewpoint of an effect of preventing liquid leakage.

As the separator, the above-described porous membrane and nonwoven fabric are preferably used in combination with a polymer gel because such a separator improves the liquid retaining property of the nonaqueous electrolyte. In such a separator, a film coated with a solvophilic polymer having a thickness of several μm or less is formed on the surface of the polyethylene microporous membrane and the wall surface of the micropore, and the nonaqueous electrolyte is held in the micropore of the film to make the solvophilic polymer gel.

Examples of the solvophilic polymer include, in addition to polyvinylidene fluoride, polymers obtained by crosslinking acrylate monomers having an ethylene oxide group or an ester group, epoxy monomers, monomers having an isocyanate group, and the like. The monomers can be crosslinked by heating or with an ultraviolet ray (UV) using a radical initiator in combination, or with an active ray or the like such as an electron beam (EB).

Other components in the battery include terminals, insulating plates, battery cases, and the like. These components may be conventionally used components.

<Assembly of Nonaqueous Electrolyte Secondary Battery>

The nonaqueous electrolyte secondary battery according to the present embodiment is shown in FIG. 1. FIG. 1 is a perspective view of the inside of the case of the rectangular nonaqueous electrolyte secondary battery. A nonaqueous electrolyte secondary battery 1 is assembled by injecting a nonaqueous electrolyte (electrolyte solution) into a battery case 3 housing an electrode group 2. The electrode group 2 is formed by winding a positive electrode including a positive active material and a negative electrode including a negative active material with a separator interposed therebetween. The positive electrode is electrically connected to a positive electrode terminal 4 via a positive electrode lead 4', and the negative electrode is electrically connected to a negative electrode terminal 5 via a negative electrode lead 5'.

The shape of the nonaqueous electrolyte secondary battery according to the present embodiment is not particularly limited, and examples of the shape include cylindrical shapes, prismatic shapes (rectangular shapes), and flat shapes.

Figure 2:
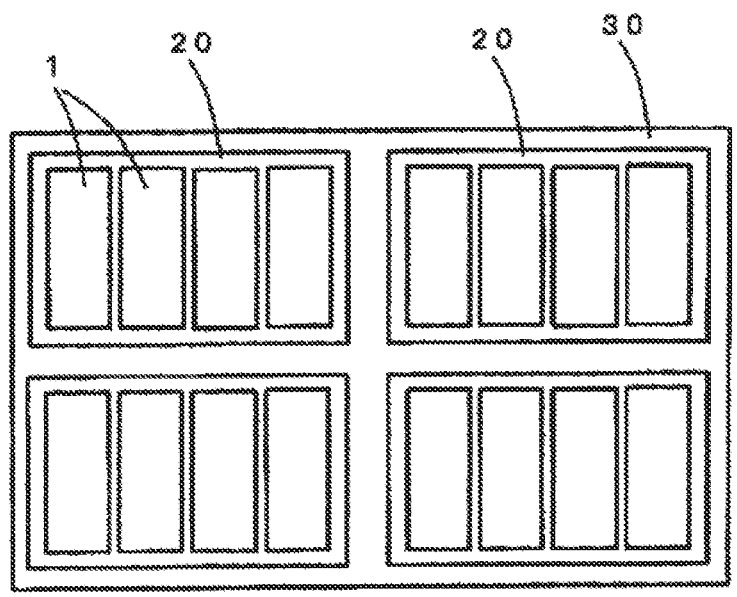
FIG. 2 is a schematic view showing an energy storage apparatus including a plurality of nonaqueous electrolyte secondary batteries.
Figure 3:
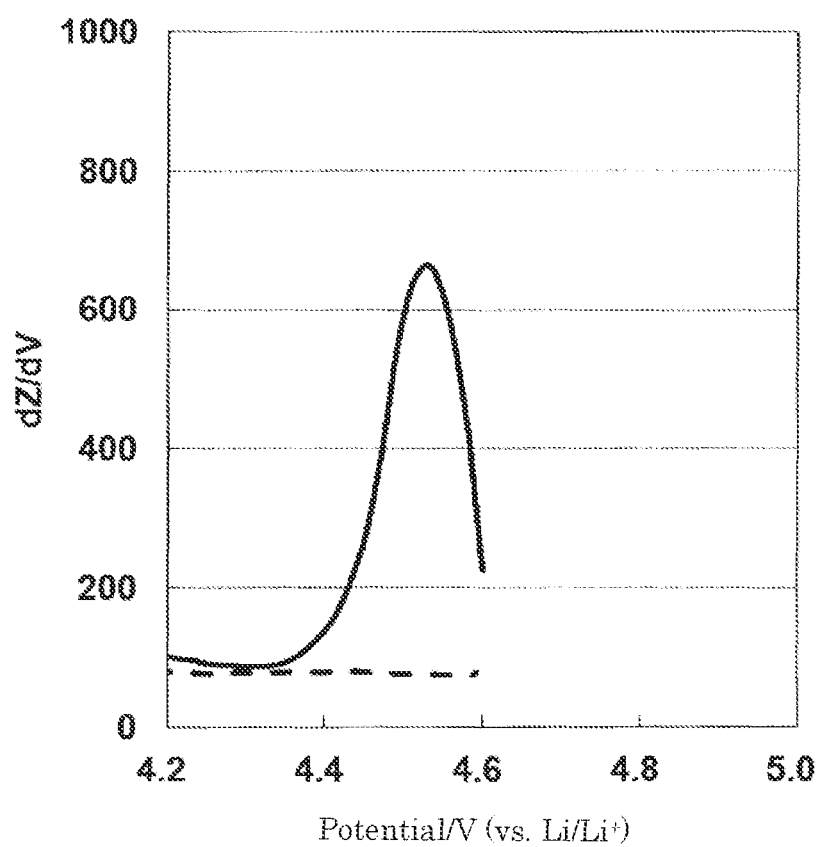

The nonaqueous electrolyte secondary battery according to the present embodiment can also be realized as an energy storage apparatus obtained by assembling a plurality of batteries. An example of the energy storage apparatus is shown in FIG. 2. In FIG. 2, an energy storage apparatus 30 includes a plurality of energy storage units 20. Each energy storage unit 20 includes a plurality of nonaqueous electrolyte secondary batteries 1. The energy storage apparatus 30 can be mounted as a power source on automobiles such as electric vehicles (EVs), hybrid electric vehicles (HEVs), and plug-in hybrid electric vehicles (PHEVs).

When a battery in which a "lithium rich active material" is used as a positive electrode is charged to a positive electrode potential of 5.0 V (vs. Li/Li$^+$) for the first time, a region where the potential change is relatively flat with respect to the amount of charge (hereinafter, referred to as "region where the potential change is flat") is observed in the positive electrode potential range of 4.5 V (vs. Li/Li$^+$) to 5.0 V (vs. Li/Li$^+$). The nonaqueous electrolyte secondary battery according to the present embodiment is preferably manufactured and used without being charged until completion of the charge process in which the region where the potential change is flat is observed.

In the nonaqueous electrolyte secondary battery according to the present embodiment, the maximum potential of the positive electrode in an initial charge-discharge process is preferably set to less than 4.5 V (vs. Li/Li$^+$). The term "initial" charge-discharge in the specification refers to charge and discharge performed one time or a plurality of times after injecting a nonaqueous electrolyte. The charge and discharge performed for the first time after injecting a nonaqueous electrolyte is particularly called "first" charge-discharge.

In the nonaqueous electrolyte secondary battery, the maximum potential of the positive electrode in normal use is preferably less than 4.5 V (vs. Li/Li$^+$). The term "normal use" in the present specification refers to a case in which the nonaqueous electrolyte secondary battery is used under the charge-discharge condition recommended or specified for the nonaqueous electrolyte secondary battery. In the case that a charger for the nonaqueous electrolyte secondary battery is prepared, the term refers to a case in which the nonaqueous electrolyte secondary battery is used with the charger.

In the case that the battery is charged, even once, until completion of the charge process in which the region where the potential change is flat is observed, the region where the potential change is flat is not observed again after the charge even if the battery is charged until the positive electrode potential reaches 5.0 V (vs. Li/Li$^+$). Therefore, in the case that a nonaqueous electrolyte secondary battery is manufactured by a method in which the maximum potential of the positive electrode in the initial charge-discharge process is set to less than 4.5 V (vs. Li/Li$^+$), and that the maximum potential of the positive electrode in normal use is less than 4.5 V (vs. Li/Li$^+$), the region where the potential change is flat is observed in the positive electrode potential range of 4.5 V (vs. Li/Li$^+$) to 5.0 V (vs. Li/Li$^+$) when the battery is charged until the positive electrode potential is more than 4.5 V (vs. Li/Li$^+$).

<Method of Confirming Region where Potential Change is Flat>

Here, the observation of the "region where the potential change is flat" is confirmed by the following procedure. A nonaqueous electrolyte secondary battery is disassembled and the positive electrode is taken out to prepare a test battery in which the positive electrode is a working electrode and metallic lithium is a counter electrode. The battery voltage and the working electrode potential (positive electrode potential) of the test battery are almost the same value, therefore, the positive electrode potential in the following procedure can be regarded as the battery voltage of the test battery. The test battery is discharged to a final potential of the positive electrode of 2.0 V (vs. Li/Li$^+$) at a current value of 10 mA per 1 g of the positive composite, and then a pause is made for 80 minutes. Then, constant current charge is performed at a current value of 10 mA per 1 g of the positive composite until the potential of the positive electrode reaches 5.0 V (vs. Li/Li$^+$). Here, when the positive electrode potential reaches 4.45 V (vs. Li/Li$^+$), the capacity from the start of charge is represented by X (mAh), and when the positive electrode potential reaches a certain potential, the capacity from the start of charge is represented by Y (mAb). At this time, the capacity ratio Z (%) is defined as Y/X*100. The capacity ratio is differentiated by the voltage to determine the value of dZ/dV in which the denominator is the difference in the positive electrode potential change and the numerator is the difference in the capacity ratio change. The positive electrode potential is plotted along the horizontal axis, and dZ/dV is plotted along the vertical axis to obtain a dZ/dV curve.

The solid line in FIG. 8 shows an example of the dZ/dV curve in the case that a nonaqueous electrolyte secondary battery is assembled that includes a positive electrode in which a "lithium rich active material" is used as a positive active material and includes a negative electrode in which metallic lithium is used, and that first charge is performed until the positive electrode potential reaches 4.6 V (vs. Li/Li$^+$). As can be seen from the dZ/dV calculation formula, the value of dZ/dV increases when the potential change decreases with respect to the capacity ratio change, and the value of dZ/dV decreases when the potential change increases with respect to the capacity ratio change. In the charge process in the region where the potential of the positive electrode containing the "lithium rich active material" is more than 4.5 V (vs. Li/Li$^+$), the value of dZ/dV increases at the beginning of the region where the potential change is flat. When the region where the potential change is flat ends and the potential increases again, the value of dZ/dV decreases. That is, a peak is observed in the dZ/dV curve. Here, when the maximum value of dZ/dV in the range of 4.5 V (vs. Li/Li$^+$) to 5.0 V (vs. Li/Li$^+$) is 150 or more, it is judged that a region where the potential change is flat is observed. The broken line shows the dZ/dV curve in the case that a battery having the same configuration as the above-described nonaqueous electrolyte secondary battery is subjected to a first charge-discharge in which the positive electrode upper limit potential is 4.6 V (vs. Li/Li$^+$) and the positive electrode lower limit potential is 2.0 V (vs. Li/Li$^+$), a pause is made for 10 minutes, and then the battery is charged for the second time until the positive electrode potential reaches 4.6 V (vs. Li/Li$^+$). In the broken line, a peak like that in the solid line is not observed. That is, if a nonaqueous electrolyte secondary battery including a positive electrode containing a "lithium rich active material" is charged, even once, until the positive electrode potential is more than 4.5 V (vs. Li/Li$^+$) and the region where the potential change is flat ends, no peak is observed in the dZ/dV curve when the battery is charged at a potential at which the positive electrode potential is more than 4.5 V (vs. Li/Li$^+$) for the second or more time.

The potential at which a flat region is observed and the capacity during charge-discharge somewhat depend on the physical property, such as the composition, of the "lithium rich active material".

<Measurement of Initial AC Resistance>

The nonaqueous electrolyte secondary battery according to the present embodiment has an effect of reducing the initial AC resistance.

In the specification of the present application, the initial AC resistance is measured under the following conditions. An object to be measured is a nonaqueous electrolyte secondary battery in a factory-shipping state that has been subjected to electrolyte solution filling and initial charge-discharge. Prior to measurement, the battery is charged and discharged at a current of 0.1 C in the voltage range in normal use, and then left for 2 hours or more in an open circuit. By the above-described operation, the nonaqueous electrolyte secondary battery is put into an end-of-discharge state. The resistance between the positive and the negative electrode terminals is measured using an impedance meter that applies an alternating current (AC) of 1 kHz, and the result is regarded as the "initial AC resistance (mΩ)". The object to be measured should not be an overcharged or overdischarged nonaqueous electrolyte secondary battery.

EXAMPLES

Example 1

<Preparation of Lithium Transition Metal Composite Oxide>

For preparation of sulfate aqueous solution, 284 g of nickel sulfate hexahydrate, 803 g of cobalt sulfate heptahydrate, and 443 g of manganese sulfate pentahydrate were weighed, and all of them were dissolved in 4 L of ion-exchanged water to prepare a 1.0 mol/L sulfate aqueous solution in which the molar ratio of Ni:Co:Mn was 27:27:46.

Next, 2 L of ion-exchanged water was poured into a 5 L reaction vessel and bubbled with an argon gas for 30 minutes to remove oxygen contained in the ion-exchanged water. The temperature of the reaction vessel was set to 50° C. (±2° C.), and a paddle blade equipped with a stirring motor was set to stir at a rotation speed of 1,500 rpm in the reaction vessel so that sufficient convection is generated in the reaction vessel. The sulfate aqueous solution was added dropwise in the reaction vessel at a rate of 3 mL/min. Here, from the start to the end of the dripping, a mixed alkaline aqueous solution including 4.0 mol/L of sodium hydroxide, 0.5 mol/L of ammonia, and 0.2 mol/L of hydrazine was appropriately added dropwise to control the pH in the reaction vessel to 9.8 (±0.1), and a part of the reaction solution was discharged by overflow to control the total amount of the reaction solution to 2 L or less. After completion of the dripping, stirring in the reaction vessel was continued for another 3 hours. After stopping the stirring, the mixture was allowed to stand at room temperature for 12 hours or more.

Next, hydroxide precursor particles generated in the reaction vessel were separated using a suction filtration device, sodium ions adhering to the particles were washed and removed using ion-exchanged water, and the resulting particles were dried at 80° C. for 20 hours under normal pressure in an air atmosphere using an electric furnace. Then, in order to uniform the particle sizes, the particles were pulverized for several minutes with an automatic agate mortar. In this way, a hydroxide precursor was prepared.

To 1.852 g of the hydroxide precursor, 0.971 g of lithium hydroxide monohydrate was added and mixed well using an automatic agate mortar to prepare a mixed powder in which the molar ratio of Li:(Ni, Co, Mn) was 130:100. Using a pellet molding machine, the mixed powder was molded at a pressure of 6 MPa to obtain a pellet having a diameter of 25 mm. The amount of the mixed powder used for the pellet molding was determined by conversion from the mass of the final product assumed to be 2 g. The pellet was mounted on an alumina boat having a total length of about 100 mm, placed in a box-type electric furnace (model number: AMF20), heated in an air atmosphere under normal pressure from room temperature to 900° C. over 10 hours, and baked at 900° C. for 5 hours. The box-type electric furnace has internal dimensions of a length of 10 cm, a width of 20 cm, and a depth of 30 cm, and has heating wires inside at intervals of 20 cm in the width direction. After the firing, the electric furnace was turned off, and the alumina boat was naturally cooled while kept in the furnace. As a result, the temperature of the furnace decreased to about 200° C. after 5 hours, and after that, the temperature decreased at a rather low rate. After a day and night, it was confirmed that the temperature of the furnace was 100° C. or less, and the pellet was taken out and pulverized for several minutes with an agate mortar in order to uniform the particle sizes.

In this way, a lithium transition metal composite oxide $Li_{1.131}Ni_{0.235}Co_{0.235}Mn_{0.40}O_2$ (LR1) was prepared.

<Preparation of Positive Electrode>

Using N-methylpyrrolidone as a dispersion medium and the above-described lithium transition metal composite oxide as a positive active material, a coating paste was prepared in which the positive active material, acetylene black (AB), and polyvinylidene fluoride (PVdF) were mixed and dispersed in a mass ratio of 90:5:5. The coating paste was applied to one surface of an aluminum foil current collector having a thickness of 20 μm, dried, and then pressed to prepare a positive electrode of Example 1.

<Preparation of Negative Electrode>

Metallic lithium foil was placed on a nickel current collector to prepare a negative electrode. The amount of the metallic lithium was adjusted so that the capacity of the battery was not limited by the negative electrode in combination with the positive electrode.

<Preparation of Nonaqueous Electrolyte>

A solution was prepared in which $LiPF_6$ and $LiN(FSO_2)_2$ (lithium bissulfonylimide: LiFSI) as electrolyte salts were dissolved in a mixed solvent including 4-fluoroethylene carbonate (FEC) and ethyl methyl carbonate (EMC) in a volume ratio of 10:90 so that the molar ratio was $LiPF_6$:LiFSI=1.1:0.1 and the total concentration of the electrolyte salts was 1.2 mol/L. In 100% by mass of the solution, 2% by mass of 4-methylsulfonyloxymethyl-2,2-dioxo-1,3,2-dioxathiolane was dissolved to prepare a nonaqueous electrolyte.

<Assembly of Nonaqueous Electrolyte Secondary Battery>

Using the positive electrode, the negative electrode, and the nonaqueous electrolyte, a nonaqueous electrolyte secondary battery was assembled by the following procedure.

As a separator, a polypropylene microporous membrane having a surface modified with polyacrylate was used. As an outer case, a metal resin composite film was used. The positive electrode of Example 1 and the negative electrode were housed in the outer case with the separator interposed therebetween so that the open ends of the positive and the negative electrode terminals were exposed to the outside, the fusion allowance where the metal-adhesive polypropylene surfaces of the metal resin composite film faced each other was hermetically sealed excluding the portion to be an injection hole, the nonaqueous electrolyte was injected, and then the injection hole was sealed to assemble a nonaqueous electrolyte secondary battery.

<Initial Charge-Discharge Process>

The assembled nonaqueous electrolyte secondary battery was subjected to an initial charge-discharge process at 25° C. The charge was performed as a constant current constant voltage (CCCV) charge at a current of 0.1 C and a final voltage of 4.25 V and the charge end condition was that the current value decayed to ⅙. The discharge was performed as a constant current discharge at a current of 0.1 C and a final voltage of 2.0 V. The charge-discharge was performed twice. Here, a pause process was provided for 30 minutes after the charge and after the discharge. In the case that the negative electrode material is metallic lithium, the positive electrode potential and the battery voltage are almost the same value.

Through the above-described manufacturing process, a nonaqueous electrolyte secondary battery of Example 1 was completed.

Comparative Example 1

A nonaqueous electrolyte secondary battery of Comparative Example 1 was completed similarly as in Example 1 except that in the preparation of the nonaqueous electrolyte, the electrolyte salt was changed to $LiPF_6$ only.

Examples 2 to 6

Nonaqueous electrolyte secondary batteries of Examples 2 to 6 were completed similarly as in Example 1 except that in the preparation of the nonaqueous electrolyte, $LiPF_6$ and LiFSI as electrolyte salts were dissolved so that the molar ratios in Examples 2 to 6 were $LiPF_6$:LiFSI=1.0:0.2, 0.8:0.4, 0.6:0.6, 0.4:0.8, and 0.2:1.0, respectively.

Example 7 and Comparative Example 2

Nonaqueous electrolyte secondary batteries of Example 7 and Comparative Example 2 were completed similarly as in Example 5 and Comparative Example 1 respectively except that in the initial charge-discharge process, the charge end voltage was changed from 4.25V to 4.5 V.

Example 8 and Comparative Example 8

Nonaqueous electrolyte secondary batteries of Example 8 and Comparative Example 8 were completed similarly as in Example 5 and Comparative Example 1 respectively except that in the preparation of the nonaqueous electrolyte, the mixed solvent of FEC and EMC was changed to a mixed solvent in which the volume ratio of ethylene carbonate (EC) to EMC was 10:90.

Example 9 and Comparative Example 4

Nonaqueous electrolyte secondary batteries of Example 9 and Comparative Example 4 were completed similarly as in Example 5 and Comparative Example 1 respectively except that in the preparation of the lithium transition metal composite oxide, the mass ratio among nickel sulfate hexahydrate, cobalt sulfate heptahydrate, manganese sulfate pentahydrate, and lithium hydroxide monohydrate used was changed to prepare a lithium transition metal composite oxide $Li_{1.091}Ni_{0.355}Co_{0.136}Mn_{0.418}O_2$ (LR2) and this lithium transition metal composite oxide was used as a positive active material.

Example 10 and Comparative Example 6

Nonaqueous electrolyte secondary batteries of Example 10 and Comparative Example 6 were completed similarly as in Example 7 and Comparative Example 2 respectively except that the lithium transition metal composite oxide LR2 prepared in Example 9 and Comparative Example 4 was used as a positive active material.

Comparative Examples 6 and 7

Nonaqueous electrolyte secondary batteries of Comparative Examples 6 and 7 were completed similarly as in Comparative Example 2 and Example 7 respectively except that in the preparation of the lithium transition metal composite oxide, the mass ratio among nickel sulfate hexahydrate, cobalt sulfate heptahydrate, manganese sulfate pentahydrate, and lithium hydroxide monohydrate used was changed to prepare a lithium transition metal composite oxide $Li_{1.2}Ni_{0.16}Co_{0.10}Mn_{0.55}O_2$ (LR3) and this lithium transition metal composite oxide was used as a positive active material.

Comparative Examples 8 and 9

Nonaqueous electrolyte secondary batteries of Comparative Examples 8 and 9 were completed similarly as in Comparative Example 1 and Example 5 respectively except that commercially available $LiNi_{0.5}Co_{0.2}Mn_{0.3}O_2$(NCM) was used as a positive active material.

<Confirmation of Crystal Structure>

The lithium transition metal composite oxides synthesized in Examples and Comparative Examples were subjected to powder X-ray diffraction measurement using an X-ray diffractometer (manufactured by Rigaku Corporation, model name: MiniFlexII) by the above-described procedure to confirm that the lithium transition metal composite oxides had an $\alpha$-$NaFeO_2$ type crystal structure.

<Confirmation of Region where Potential Change is Relatively Flat with Respect to Amount of Charge>

The nonaqueous electrolyte secondary battery of each of Examples and Comparative Examples was charged until the positive electrode potential reached 5.0 V (vs. $Li/Li^+$) (that is, charged for the third time), the dZ/dV curve was obtained by the above-described procedure, and the region where the potential change was relatively flat was confirmed.

In the manufacturing process of the nonaqueous electrolyte secondary battery, the region where the potential change was relatively flat was observed when the battery was charged for the third time in Comparative Example 1, Examples 1 to 6. Comparative Example 3, Example 8, Comparative Example 4, and Example 9, in which the first and the second charge end voltages were set to 4.25 V. Meanwhile, the region where the potential change was relatively flat was not observed when the battery was charged for the third time in Comparative Example 2, Example 7, Comparative Example 5, Example 10, and Comparative Examples 6 and 7, in which the first and the second charge end voltages were set to 4.5 V. Furthermore, the region where the potential change was relatively flat was not observed also when the battery was charged for the third time in Comparative Examples 8 and 9 in which a positive electrode containing an NCM that was nota "lithium rich active material" (L/Me=1.0) was used.

<Measurement of Initial AC Resistance>

The initial AC resistance of the nonaqueous electrolyte secondary battery of each of Examples and Comparative Examples was measured in accordance with the above-described procedure.

The initial AC resistance was regarded as 100% in Comparative Examples 1 to 6 and Comparative Example 8, in which no LiFSI was contained as an electrolyte salt. In Examples 1 to 10 and Comparative Examples 7 and 9, "the ACR ratio/%" was determined. The "ACR ratio/%" is the ratio of the initial AC resistance of Example or Comparative Example in which LiFSI was contained to the initial AC resistance of similar Example or Comparative Example in which no LiFSI was contained. Table 1 shows the results.

TABLE 1

| | Positive active material | Charge voltage/ V | Content of $LiPF_6$/ mol $L^{-1}$ | Content of LiFSI/ mol $L^{-1}$ | Mixing ratio of LiFSI/% | Solvent (volume ratio) | ACR ratio/% |
|---|---|---|---|---|---|---|---|
| Comparative Example 1 | LR1 Li/Me = 1.3 Mn/Me = 0.46 | 4.25 | 1.2 | 0 | 0 | FEC/EMC (10/90) | 100 |
| Example 1 | | | 1.1 | 0.1 | 8 | | 95.4 |
| Example 2 | | | 1.0 | 0.2 | 17 | | 95.8 |
| Example 3 | | | 0.8 | 0.4 | 33 | | 94.4 |
| Example 4 | | | 0.6 | 0.6 | 50 | | 94.8 |
| Example 5 | | | 0.4 | 0.8 | 67 | | 89.1 |
| Example 6 | | | 0.2 | 1.0 | 83 | | 91.9 |
| Comparative Example 2 | ↑ | 4.5 | 1.2 | 0 | 0 | ↑ | 100 |
| Example 7 | | | 0.4 | 0.8 | 67 | | 94.5 |
| Comparative Example 3 | ↑ | 4.25 | 1.2 | 0 | 0 | EC/EMC (10/90) | 100 |
| Example 8 | | | 0.4 | 0.8 | 67 | | 91.8 |
| Comparative | LR2 | 4.25 | 1.2 | 0 | 0 | FEC/EMC | 100 |

TABLE 1-continued

| | Positive active material | Charge voltage/V | Content of LiPF$_6$/mol L$^{-1}$ | Content of LiFSI/mol L$^{-1}$ | Mixing ratio of LiFSI/% | Solvent (volume ratio) | ACR ratio/% |
|---|---|---|---|---|---|---|---|
| Example 4 | Li/Me = 1.2 | | | | | (10/90) | |
| Example 9 | Mn/Me = 0.46 | | 0.4 | 0.8 | 67 | | 94.3 |
| Comparative Example 5 | | 4.5 | 1.2 | 0 | 0 | | 100 |
| Example 10 | | | 0.4 | 0.8 | 67 | | 93.6 |
| Comparative Example 6 | LR3 Li/Me = 1.48 | 4.5 | 1.2 | 0 | 0 | ↑ | 100 |
| Comparative Example 7 | Mn/Me = 0.68 | | 0.4 | 0.8 | 67 | | 146.0 |
| Comparative Example 8 | NCM Li/Me = 1.0 | 4.25 | 1.2 | 0 | 0 | ↑ | 100 |
| Comparative Example 9 | Mn/Me = 0.30 | | 0.4 | 0.8 | 67 | | 99.0 |

In the nonaqueous electrolyte secondary battery of each of Examples 1 to 8 and Comparative Examples 1 to 3, the lithium transition metal composite oxide having a molar ratio of Li to Me, Li/Me of 1.3 and a molar ratio of Mn to Me, Mn/Me of 0.46 (LRD) is used as a positive active material, and the charge end voltage is 4.25 V in the initial charge-discharge process. By comparing Examples 1 to 6 in which LiFSI is contained as an electrolyte salt with Comparative Example 1 in which no LiFSI is contained, it can be seen that an effect of reducing the initial AC resistance is exhibited with LiFSI contained as an electrolyte salt. The effect is confirmed in the case that the molar ratio of LiFSI, which is a lithium imide salt, in the electrolyte salt is 8% or more and 83% or less, and the greatest effect is exhibited when the molar ratio is 67%.

It can be seen that an effect of reducing the initial AC resistance is exhibited with LiFSI contained as an electrolyte salt also in the nonaqueous electrolyte secondary batteries of Comparative Example 2 and Example 7 in which the charge end voltage is 4.5 V in the initial charge-discharge process.

It can be seen that an effect of reducing the initial AC resistance is exhibited with LiFSI contained as an electrolyte salt also in the nonaqueous electrolyte secondary batteries of Comparative Example 3 and Example 8 in which the nonaqueous solvent of the nonaqueous electrolyte is a mixed solvent of EC and EMC.

It can be seen that an effect of reducing the initial AC resistance is exhibited with LiFSI contained as an electrolyte salt also in the nonaqueous electrolyte secondary batteries of Comparative Example 4, Example 9, Comparative Example 5, and Example 10 in which the lithium transition metal composite oxide having a molar ratio of Li to Me, Li/Me of 1.2 and a molar ratio of Mn to Me, Mn/Me of 0.46 (LR2) is used as a positive active material.

In the nonaqueous electrolyte secondary battery of each of Comparative Examples 6 and 7, the lithium transition metal composite oxide having a molar ratio of Li to Me, Li/Me of 1.48 and a molar ratio of Mn to Me, Mn/Me of 0.68 (LR3) is used as a positive active material. By comparing Comparative Example 6 in which no LiFSI is contained as an electrolyte salt with Comparative Example 7 in which LiFSI is contained, it can be seen that the initial AC resistance is, contrarily, increased by containing LiFSI.

Therefore, it can be seen that an effect of the present invention is exhibited in the case that the "lithium rich active material" is a lithium transition metal composite oxide having a composition in which the molar ratio of Mn to Me, Mn/Me is not too large.

In the nonaqueous electrolyte secondary batteries of Comparative Examples 8 and 9 in which LiMeO$_2$ type active material (MCM) having a molar ratio of Li to Me, Li/Me of 1.0 is used as a positive active material, almost no effect of reducing the initial AC resistance is exhibited with LiFSI contained as an electrolyte salt.

The nonaqueous electrolyte secondary battery of each of Examples 6 and 7 after the initial charge-discharge was disassembled in a glove box having an argon atmosphere, and the positive electrode was subjected to X-ray diffraction measurement by the above-described procedure. As a result, in the positive active material of the nonaqueous electrolyte secondary battery of Example 6 in which the maximum potential of the positive electrode was 4.25 V (vs. Li/Li$^+$), a diffraction peak was observed in the range of 20 to 22°. Meanwhile, in the positive active material of the nonaqueous electrolyte secondary battery of Example 7 in which the maximum potential of the positive electrode was 4.5 V (vs. Li/Li$^+$), no diffraction peak was observed in the range of 20 to 22°.

INDUSTRIAL APPLICABILITY

The nonaqueous electrolyte secondary battery according to the present invention is useful as a power source for automobiles such as electric vehicles, hybrid electric vehicles, and plug-in hybrid electric vehicles because the initial AC resistance is reduced.

DESCRIPTION OF REFERENCE SIGNS

1: Nonaqueous electrolyte secondary battery
2: Electrode group
3: Battery case
4: Positive electrode terminal
4': Positive electrode lead
5: Negative electrode terminal
5': Negative electrode lead
20: Energy storage unit
30: Energy storage apparatus

The invention claimed is:
1. A nonaqueous electrolyte secondary battery comprising a positive electrode, a negative electrode, and a nonaqueous electrolyte,
  wherein the nonaqueous electrolyte secondary battery has undergone an initial charge-discharge,
   a maximum potential of the positive electrode in the initial charge-discharge is less than 4.5 V (vs. Li/Li$^+$), the positive electrode contains, as a positive active material, a lithium transition metal composite oxide of $Li_{(1+\alpha)}(Ni_xCo_yMn_z)_{(1-\alpha)}O_2$ where x+y+z=1 and 0<α, the lithium transition metal composite oxide having:
an α-NaFeO$_2$ type crystal structure,
a molar ratio of Li to Me, Li/Me of more than 1, Me representing transition metal elements including Ni, Mn, and Co,
a molar ratio of Mn to Me, Mn/Me of 0.40 or more and 0.65 or less, and
a diffraction peak observed in a range of 20 to 22° in an X-ray diffraction diagram obtained using a CuKα ray, and
the nonaqueous electrolyte contains, as an electrolyte salt, LiPF$_6$ and LiN(FSO$_2$)$_2$.

2. The nonaqueous electrolyte secondary battery according to claim 1, wherein the lithium transition metal composite oxide contained, as the positive active material, in the positive electrode has a molar ratio of Li to Me, Li/Me of 1.15 or more and 1.30 or less.

3. A method of manufacturing the nonaqueous electrolyte secondary battery according to claim 1, the method comprising setting a maximum potential of the positive electrode in an initial charge-discharge process to less than 4.5 V (vs. Li/Li$^+$).

4. A method of using the nonaqueous electrolyte secondary battery according to claim 1, the method comprising setting a maximum potential of the positive electrode during charge to less than 4.5 V (vs. Li/Li$^+$).

5. The nonaqueous electrolyte secondary battery according to claim 1,
wherein the lithium transition metal composite oxide contained, as the positive active material, in the positive electrode has a molar ratio of Li to Me, Li/Me of more than 1.2, and
wherein the lithium transition metal composite oxide contained, as the positive active material, in the positive electrode has the molar ratio of Mn to Me, Mn/Me of 0.40 or more and 0.46 or less.

6. The nonaqueous electrolyte secondary battery according to claim 1,
wherein the diffraction peak is a superlattice peak of a Li[Li$_{1/3}$Mn$_{2/3}$]O$_2$ type monoclinic crystal.

7. The nonaqueous electrolyte secondary battery according to claim 1,
wherein the lithium transition metal composite oxide contained, as the positive active material, in the positive electrode has a molar ratio of Co to Me, Co/Me of 0 or more and 0.4 or less.

8. The nonaqueous electrolyte secondary battery according to claim 1,
wherein the lithium transition metal composite oxide contained, as the positive active material, in the positive electrode has a molar ratio of Ni to Me, Ni/Me of 0.2 or more and 0.5 or less.

9. The nonaqueous electrolyte secondary battery according to claim 1,
wherein the lithium transition metal composite oxide contained, as the positive active material, in the positive electrode has a molar ratio of Li to Me, Li/Me of 1.2 or more and 1.3 or less, and
a molar ratio of LiN(FSO$_2$)$_2$ in the electrolyte salt is 8% or more and 83% or less.

10. The nonaqueous electrolyte secondary battery according to claim 1,
wherein the lithium transition metal composite oxide contained, as the positive active material, in the positive electrode has a molar ratio of Li to Me, Li/Me of 1.2 or more and 1.3 or less,
the lithium transition metal composite oxide contained, as the positive active material, in the positive electrode has the molar ratio of Mn to Me, Mn/Me of 0.46,
a molar ratio of LiN(FSO$_2$)$_2$ in the electrolyte salt is 8% or more and 83% or less, and
the nonaqueous electrolyte further contains, as nonaqueous solvent, ethyl methyl carbonate and at least one of 4-fluoroethylene carbonate or ethylene carbonate.

* * * * *